April 16, 1968     H. POPPINGER ET AL     3,378,753
CIRCUIT-INITIATING SELF-EXCITATION OF A THREE-PHASE ALTERNATOR
Filed May 11, 1965

United States Patent Office 3,378,753
Patented Apr. 16, 1968

3,378,753
CIRCUIT-INITIATING SELF-EXCITATION OF A THREE-PHASE ALTERNATOR
Herbert Poppinger, Munich, Germany, Werner Volkmann, Erie, Pa., and Manfred Liska, Munich, Germany, assignors to Siemens Aktiengesellschaft, a corporation of Germany
Filed May 11, 1965, Ser. No. 454,876
Claims priority, application Germany, May 14, 1964, S 91,059
14 Claims. (Cl. 322—28)

ABSTRACT OF THE DISCLOSURE

A voltage regulator provides a substantially constant DC voltage and is connected between the output terminals of an alternator and the excitation winding thereof. A switch is connected as a bridge across the voltage regulator between the output terminals of the alternator and the excitation winding thereof. A control circuit is coupled to the output terminals of the alternator for controlling the conductive condition of the switch to switch the switch to its current conducting condition thereby to short-circuit the voltage regulator and apply the output voltage of the alternator directly to the excitation winding of the alternator when the output voltage has a magnitude which is below that required for self-excitation of the alternator.

---

Figure 1:
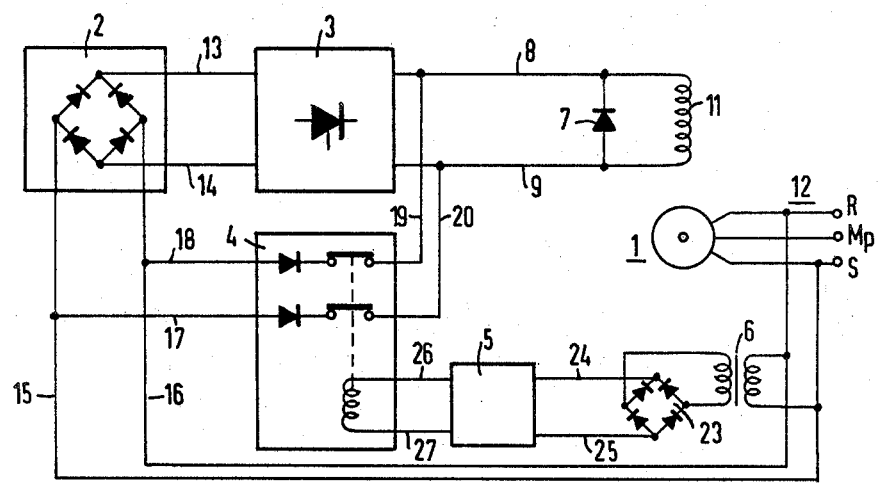

The present invention relates to a circuit for initiating self-excitation of an alternator. More particularly, the invention relates to a circuit for initiating self-excitation of a three-phase alternator.

In a self-excited alternator, the remanence voltage required to initiate self-excitation either is of insufficient initial magnitude or level or does not attain a sufficient level with reliability. This is particularly the fact with AC or three-phase alternators or generators which are self-excited via semiconductor components, as well as with machines having self-excitation circuits comprising semiconductor components such as thyristors, and/or movable contacts such as slip-rings. Such components conduct current only after a threshold voltage is applied thereto. Where several threshold voltages are additively effective in the excitation circuit, a minimum remanence voltage of 3 volts or more may be necessary to reliably initiate self-excitation. This results in a very high remanence voltage, percentagewise, in machines producing a low output voltage. If the output or rated voltage is 25 volts, a minimum remanence voltage of 3 volts amounts to 12 percent. This is particularly disadvantageous when the alternator or generator is driven at a high variable speed and its output voltage is kept constant by a voltage regulator. This is the situation with the electrical systems of vehicles and results in the electrical equipment becoming operable only after the vehicle reaches a relatively high speed.

Although expedients are known for providing high remanent voltages such as, for example, built-in permanent magnets or utilizing materials having a wide hysteresis loop in the inductor of the machine, they materially increase the cost, weight and dimensions of the machine. Furthermore, even in alternators having a high rated voltage and a minimum remanent voltage which is low, percentagewise, in which the remanent voltage is produced without special expedients, the remanent voltage is not always provided with reliability. Thus, after a short circuit, a long period of non-operation or mechanical vibrations, for example, the remanence voltage may drop to a fraction of its normal value.

A transformer having a relatively high transformation ratio may be utilized, having a primary winding connected to the output terminals of the alternator and a secondary winding connected to the excitation winding of the alternator via a rectifying stage. The transformer must temporarily provide a relatively high exciting current and must be dimensioned accordingly. Furthermore, care must be taken to limit the secondary voltage of the transformer to a permissible level.

The principal object of the present invention is to provide a new and improved circuit for initiating the self-excitation of an alternator.

In accordance with the present invention, a circuit for initiating self-excitation of an alternator having an excitation winding positioned in operative proximity with other components of the alternator and output terminal means for providing the output voltage of an alternator comprises a voltage regulator for providing a substantially constant DC voltage connected between the output terminal means of the alternator and the excitation winding thereof. A switch having a current-conducting condition and a non-conducting condition is connected to a bridge across the voltage regulator between the output terminal means of the alternator and the excitation winding thereof. Control means coupled to the output terminal means of the alternator controls the conducting condition of the switch to switch the switch to its current-conducting condition thereby to short-circuit the voltage regulator and apply the output voltage of the alternator directly to the excitation winding of the alternator when the output voltage has a magnitude which is below that required for self-excitation of the alternator. The control means comprises transformer means having primary winding means connected to the output terminal means of the alternator and secondary winding means producing a voltage for switching the switch to its current-conducting condition when the output voltage of the alternator has a magnitude below that required for self-excitation of the alternator for switching the switch to its non-conducting condition when the output voltage has a magnitude equal to or greater than that required for the self-excitation, thereby to apply voltage to the excitation winding of the alternator through the voltage regulator when the output voltage of the alternator has a magnitude which is at least equal to that required for self-excitation of the alternator.

The control means of the circuit, in one embodiment of the present invention, includes rectifier means having an input connected to the secondary winding means of the transformer means and an output, and a bistable multivibrator connected between the output of the rectifier means and the switch. The bistable multivibrator is controlled in its stable condition by the transformer means to produce a first signal for switching the switch to its current-conducting condition and to produce a second signal for switching the switch to its non-conducting condition.

In another embodiment of the present invention, the output means of the rectifier means is coupled by coupling means to the switch to directly control the switch in its conducting condition. The switch comprises semiconductor thyristors each having a control electrode for determining the conducting condition thereof. The coupling means includes further rectifier means coupling the output means of the rectifier means to the control electrodes of the thyristors to control the conducting condition thereof.

A Zener diode and further thyristors are connected as a switch in the coupling means of the control means of the circuit and function to short-circuit the control voltage to the thyristors of the switch when the output voltage of the alternator is above the magnitude sufficient for self-excitation thereof.

Figure 2:
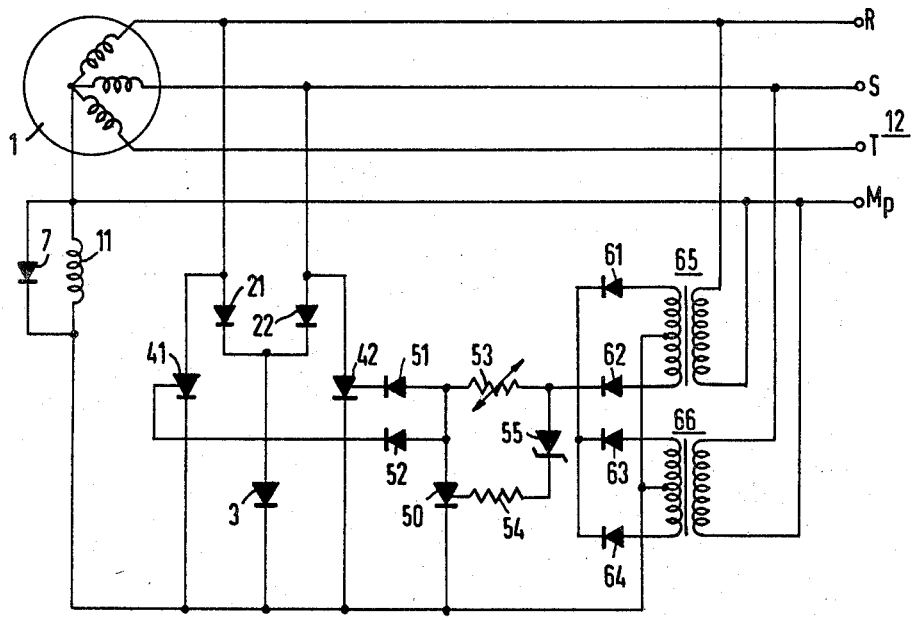

In order that the present invention may be readily carried out into effect it will now be described with reference to the accompanying drawings, wherein:

FIG. 1 is a circuit diagram of an embodiment of the circuit of the present invention, partially in block form; and FIG. 2 is a circuit diagram of another embodiment of the circuit of the present invention.

In FIG. 1, an alternator 1 having an excitation winding 11 and output terminals 12 produces at its output terminals a three-phase AC voltage. The three output terminals 12 comprise terminals R, S and Mp. The alternator 1 is driven at a highly variable speed.

The excitation winding 11 of the alternator 1 is connected via a DC regulator 3 and a rectifier 2 to the terminals 12 of said alternator. Thus the excitation winding 11 is connected to the DC regulator 3 via leads 8 and 9, said DC regulator is connected to the rectifier 2 via leads 13 and 14, and said rectifier is connected to the terminals R and S of the output terminals 12 of the alternator 1 via leads 15 and 16.

The DC regulator 3 comprises suitable semiconductor thyristors such as, for example, semiconductor controlled rectifiers or silicon controlled rectifiers or SCR's, and functions to regulate the output terminal voltage of the alternator 1 to a constant magnitude after said voltage is first rectified by the rectifier 2.

The series connection of the rectifier 2 and the DC voltage regulator 3 is bridged by a polarized switching circuit 4 which is connected between the leads 15 and 16 and the leads 8 and 9 via leads 17 and 18 and 19 and 20, respectively. The polarized switching circuit 4 functions to conduct current in one direction when it is in its closed or conductive condition. The polarized switching circuit 4 has a closed or conductive condition and an open or non-conductive condition.

The condition of the polarized switching circuit 4 is controlled by a trigger 5. The trigger 5 is coupled to the output terminals of the alternator 1 via the leads 15 and 16, an auxiliary transformer 6, a rectifier 23 and leads 24 and 25. The trigger 5 is connected to the polarized switching circuit 4 via leads 26 and 27. The trigger 5 is controlled by the alternator output voltage, which is rectified by the rectifier 23 before it is applied thereto.

The trigger 5 is provided with determined characteristics which are selected to maintain the polarized switching circuit 4 in its closed condition as long as the output voltage of the alternator remains below the magnitude or level necessary for self-excitation of said alternator. Thus, the switching circuit 4 is in its conductive or closed condition and conducts current directly from the output terminals 12 of the alternator 1 to the excitation winding 11 as long as the output voltage of said alternator is below the magnitude necessary for self-excitation.

Since the magnitude of the output voltage of the alternator 1 is always below the magnitude necessary for self-excitation of said alternator during the acceleration, starting or warm-up period of the generator, the excitation winding 11 remains connected directly to the output terminals of said alternator throughout its starting period. The rectifier 2 and DC voltage rectifier 3 are thus bypassed and ineffective during the warm-up period of the alternator 1.

The output voltage of the alternator 1 reaches the magnitude required for self-excitation of said alternator at a relatively low speed. As soon as the magnitude of the output voltage reaches that required for self-excitation of the alternator 1, the trigger 5 opens or makes non-conductive the switching circuit 4. As soon as the switching circuit 4 becomes non-conductive, the excitation winding 11 is energized by the alternator output voltage via the rectifier 2 and the DC voltage regulator 3 and said voltage regulator is then effective to regulate the excitation voltage.

The trigger 5 may comprise any suitable bistable multivibrator or flip flop, which is maintained in one stable state, in which it maintains the switching circuit 4 in its conductive condition, as long as its input is below the magnitude required for self-excitation of the alternator 1, and which is maintained in its other stable state, in which it maintains said switching circuit in its non-conductive condition, as long as its input is above the magnitude required for self-excitation of said alternator. A suitable bistable multivibrator or flip flop, for example, is that described in pages 157 to 159 of "Computer Basics," volume 3, Digital Computers-Mathematics and Circuitry, by Technical Education and Management, Inc., Howard W. Sams & Co., Inc., First Edition, 1962. It may be desirable to utilize as the trigger 5 a Schmitt trigger of the type described in pages 133 to 136 of Computer Basics, volume 6, Solid-State Computer Circuits, by Technical Education and Management, Inc., Howard W. Sams & Co., Inc., First Edition, 1962.

The trigger 5 provides an output signal to open the polarized switching circuit 4 as soon as the input voltage to said trigger has a magnitude equal to a first determined magnitude. The trigger 5 continues to produce such output signal to maintain the switching circuit 4 open even when the input voltage to said trigger drops in magnitude to a level below the first determined magnitude. When the input voltage to the trigger 5 drops in magnitude to a level below a second determined magnitude, however, said trigger produces a different output signal. The trigger 5 continues to produce such different output signal to maintain the switching circuit 4 closed as long as the magnitude of the input voltage to said trigger remains below the second determined magnitude. The second determined magnitude is less than the first determined magnitude in value.

Due to the dependence of the output voltage of the alternator 1 upon the speed of said alternator and due to hysteresis at lower speeds, the ratio of the first determined magnitude to the second determined magnitude is sufficiently high. Also, the different output signals of the trigger 5 have a predetermined magnitude ratio. In any event, the trigger 5 produces its second signal, to close the switching circuit 4, only when the alternator output voltage has a magnitude which is insufficient for self-excitation of said alternator. Furthermore, the transformation ratio of the transformer 6, the characteristics of the alternator and the regulation of the trigger 5 are accounted for in determining that the trigger will produce its first signal, to open the switching circuit 4, only when the alternator output voltage has a magnitude which is sufficient for self-excitation of said alternator.

The switching circuit 4 may comprise relay-operated switches comprising a pair of spaced armatures, one connected in the lead 18, 19 and the other connected in the lead 17, 20, positioned by the energization condition of an excitation winding of said relay. The excitation winding of the relay may be connected directly to the output of the trigger 5, so that when said trigger is in its set or reset condition, said relay excitation winding will be deenergized or energized to position the armatures in circuit closing position, and when said trigger is in its reset or set condition, said relay excitation winding will be energized or deenergized to position said armatures in circuit opening position.

The switching circuit 4 may comprise suitable field plates which have resistances which vary with control magnetic fields. Field plates which function in a polarized manner to provide a blocked or open circuit under specified conditions are especially suitable. The control energy may be kept very low. The control magnet field of the field plates may be controlled in turn directly by the current in the excitation winding 11 of the alternator 1.

As long as the current in the excitation winding 11 is zero or of very low magnitude, the field plates have a very low resistance and bridge the DC voltage regulator. Self-excitation of the alternator may occur at very low alternator speeds. When the current in the excitation winding 11 increases in magnitude and reaches the magnitude required for self-excitation of the alternator 1, the resistance of the field plates reaches a very high magnitude and the field plates function as an open circuit so that the voltage applied to said excitation winding is then controlled by the DC voltage regulator 3.

Suitable field plates, which may be utilized in the present invention, are those described in U.S. Patent No. 2,894,234 and in pending U.S. patent applications Ser. No. 273,776, filed Apr. 17, 1963, Ser. No. 361,316, filed Apr. 20, 1964, and Ser. No. 418,648, filed Dec. 16, 1964.

A simple embodiment of the system of the present invention comprises the connection of the excitation winding of the alternator 1 at one end to two of the three three-phase output terminals of the alternator 1 via two rectifiers and the connection of said excitation winding at the other end to the neutral point of the three-phase output terminals of said alternator, as shown in FIG. 2. In each of FIGS. 1 and 2, a diode 7 is connected across the excitation winding 11.

In FIG. 2, the excitation winding 11 is connected at one end to the neutral point Mp of the three-phase outputs of the alternator 1. The other end of the excitation winding 11 is connected to the three-phase output terminals R and S via separate paths. The first path comprises a thyristor 3 and a pair of diode rectifiers 21 and 22. The thyristor 3 is connected to the output terminal R via the diode rectifier 21 and to the output terminal S via the diode rectifier 22. Thus, the cathode of the thyristor 3 may be connected to the excitation winding 11, the anode of said thyristor may be connected to the cathode of each of the diode rectifiers 21 and 22, the anode of the diode rectifier 21 is connected to the output terminal R, and the anode of the diode rectifier 22 is connected to the output terminal S.

The second path comprises bridging circuits for the thyristor 3 and the diode 21 and for said thyristor and the diode 22. The thyristor 3 and the diode 21 are bridged by an auxiliary thyristor 41 having its cathode connected to the excitation winding 11 and its anode connected to the output terminal R. The thyristor 3 and the diode 22 are bridged by an auxiliary thyristor 42 having its cathode connected to the excitation winding 11 and its anode connected to the output terminal S.

Each of the thyristors has a control electrode or gate through which its conductive condition is determined. The control voltage for the auxiliary thyristors is derived from the output terminals R and Mp and S and Mp via transformers 65 and 66, the transformer 65 having a primary winding connected between the output terminals R and Mp and the transformer 66 having a primary winding connected between the output terminals S and Mp. The transformer 65 has a secondary winding which provides a voltage which is rectified by diode rectifiers 61 and 62 connected to the ends thereof. The transformer 66 has a secondary winding which provides a voltage which is rectified by diode rectifiers 63 and 64.

The direct voltages provided by the diodes 61 and 62 and by the diodes 63 and 64 are applied to the gates or control electrodes of the auxiliary thyristors 41 and 42 via a non-linear variable resistor 53 and diodes 51 and 52. The non-linear variable resistor 53 has a resistance value which increases as the voltage across it increases and functions to limit the control voltage of the auxiliary thyristors 41 and 42.

A thyristor 50 is connected in series with each of the diodes 51 and 52 between the control electrode of each of the auxiliary thyristors 41 and 42 and the cathode thereof. Thus, the cathode of the thyristor 50 is connected to the cathodes of the auxiliary thyristors 41 and 42 and the anode of said thyristor 50 is connected to the anodes of the diodes 51 and 52. The cathode of the diode 51 is connected to the control electrode of the auxiliary thyristor 41 and the cathode of the diode 52 is connected to the control electrode of the auxiliary thyristor 42. The direct voltages provided by the diodes 61 and 62 and by the diodes 63 and 64 are applied to the gate or control electrode of the thyristor 50 via Zener diode 55 and a resistor 54.

When the output voltage of the alternator 1 is below the magnitude or level necessary for self-excitation of said alternator and when the secondary voltage of the transformers 65 and 66 exceeds a magnitude determined by the threshold levels of the diodes 61, 62, 63 and 64, the threshold levels of the diodes 51 and 52 and the firing voltage of the auxiliary thyristors 41 and 42, said auxiliary thyristors are fired so that they are in their conductive condition and the excitation winding 11 of the alternator 1 is directly connected between the output terminals R and S at one end and the output terminal Mp at the other end. The excitation winding 11 is energized by a continuous pulsatory D.C. current. The transformation ratio of each of the transformers 65 and 66 is high enough so that the threshold levels of the diodes and the firing voltage of the auxiliary thyristors are reached by the secondary voltage of said transformers at very low output voltage magnitudes of the alternator 1. Such low voltage magnitudes of the alternator 1 may be attained due to the remanence voltage of said alternator.

When the output voltage of the alternator 1 reaches the magnitude or level necessary for self-excitation of said alternator, the Zener diode 55 is made conductive and the thyristor 50 fires so that it is in its conductive condition. When the thyristor 50 is conductive, it short-circuits the control voltage of the auxiliary thyristors 41 and 42, so that no control voltage is applied to the control grids of said auxiliary thyristors and said auxiliary thyristors are switched to their non-conductive, cut off or extinguished condition.

The thyristor 3 is controlled in its conductive condition by a suitable circuit arrangement which is not within the scope of the present invention. Such a circuit arrangement may comprise that described in copending patent application Ser. No. 396,950 and in U.S. Patent 3,009,091. When the thyristor 3 is in its conductive condition, the excitation winding 11 is energized via the rectifiers 21 and 22 and said thyristor. The current flowing through the thyristor 50, when it is in its conductive condition, as well as the current flowing through the auxiliary thyristors 41 and 42, when they are in their conductive conditions, is limited by the non-linear variable resistor 53.

The thyristor 50 is switched to its non-conductive condition when the magnitude of the output voltage of the alternator 1 drops to a level below the magnitude necessary for self-excitation of said alternator. When the secondary voltage of the transformers 65 and 66 is of sufficient magnitude to fire the auxiliary thyristors 41 and 42, such thyristors are switched to their conductive condition.

While the invention has been described by means of specific examples and in a specific embodiment, we do not wish to be limited thereto, for obvious modifications will occur to those skilled in the art without departing from the spirit and scope of the invention.

We claim:

1. A circuit for initiating self-excitation of an alternator having an excitation winding positioned in operative proximity with other components of said alternator and output terminal means for providing the output voltage of said alternator, said circuit comprising voltage regulating means for providing a substantially constant DC voltage connected between the output terminal means of said alternator and the excitation winding thereof, said voltage regulating means being controlled by a threshold signal;

switching means having a current conducting condition and a non-conducting condition connected as a bridge across said voltage regulating means between the output terminal means of said alternator and the excitation winding thereof; and control means coupled to the output terminal means of said alternator for controlling the conducting condition of said switching means to switch said switching means to its current conducting condition thereby to short-circuit said voltage regulating means and apply the output voltage of said alternator directly to the excitation winding of said alternator when said output voltage has a magnitude which is below that required for self-excitation of said alternator, said control means comprising transformer means having primary winding means connected to the output terminal means of said alternator and secondary winding means, rectifier means having an input connected to the secondary winding means of said transformer means and an output, and bistable multivibrator means connected between the output of said rectifier means and said switching means, said bistable multivibrator means being controlled in its stable condition by said transformer means to produce a first signal for switching said switching means to its current conducting condition when said output voltage of said alternator has a magnitude below that required for self-excitation of said alternator and to produce a second signal for switching said switching means to its non-conducting condition when said output voltage has a magnitude equal to and greater than that required for said self-excitation thereby to apply voltage to the excitation winding of said alternator through said voltage regulating means when the output voltage of said alternator has a magnitude which is at least equal to that required for self-excitation of said alternator.

2. A circuit as claimed in claim 1, wherein said bistable multivibrator means comprises a Schmitt trigger circuit.

3. A circuit as claimed in claim 1, wherein said transformer means has a determined transformation ratio and said bistable multivibrator means has a determined characteristic whereby said switching means is switched to its non-conductivity condition by the second signal produced by said bistable multivibrator means at the instant that the output voltage of said alternator has a magnitude equal to the minimum magnitude required for self-excitation of said alternator.

4. A circuit as claimed in claim 1, wherein said rectifier means comprises full-wave rectifier means.

5. A circuit as claimed in claim 1, wherein the first and second signals of said bistable multivibrator means have a predetermined magnitude ratio.

6. A circuit for initiating self-excitation of an alternator having an excitation winding positioned in operative proximity with other components of said alternator and output terminal means for providing the output voltage of said alternator, said circuit comprising voltage regulating means for providing a substantially constant DC voltage connected between the output terminal means of said alternator and the excitation winding thereof, said voltage regulating means being controlled by a threshold signal;

switching means having a current conducting condition and a non-conducting condition connected as a bridge across said voltage regulating means between the output terminal means of said alternator and the excitation winding thereof, said switching means comprising thyristor means having control electrode means for determining the conducting condition thereof; and control means coupled to the output terminal means of said alternator for controlling the conducting condition of said switching means to switch said switching means to its current conducting condition thereby to short-circuit said voltage regulating means and apply the output voltage of said alternator directly to the excitation winding of said alternator when said output voltage has a magnitude which is below that required for self-excitation of said alternator, said control means comprising transformer means having primary winding means connected to the output terminal means of said alternator and secondary winding means, rectifier means having input means connected to the secondary winding means of said transformer means and output means, and coupling means including further rectifier means coupling the output means of said rectifier means to the control electrode means of said thyristor means for switching said switching means to its current conducting condition when said output voltage of said alternator has a magnitude below that required for self-excitation of said alternator and for switching said switching means to its non-conducting condition when said output voltage has a magnitude equal to and greater than that required for said self-excitation thereby to apply voltage to the excitation winding of said alternator through said voltage regulating means when the output voltage of said alternator has a magnitude which is at least equal to that required for self-excitation and of said alternator.

7. A circuit for initiating self-excitation of an alternator having an excitation winding positioned in operative proximity with other components of said alternator and output terminal means for providing the output voltage of said alternator, said circuit comprising voltage regulating means for providing a substantially constant DC voltage connected between the output terminal means of said alternator and the excitation winding thereof, said voltage regulating means being controlled by a threshold signal;

switching means having a current conducting condition and a non-conducting condition connected as a bridge across said voltage regulating means between the output terminal means of said alternator and the excitation winding thereof, said switching means comprising thyristor means having control electrode means for determining the conducting condition thereof; and control means coupled to the output terminal means of said alternator for controlling the conducting condition of said switching means to switch said switching means to its current conducting condition thereby to short-circuit said voltage regulating means and apply the output voltage of said alternator directly to the excitation winding of said alternator when said output voltage has a magnitude which is below that required for self-excitation of said alternator, said control means comprising transformer means having primary winding means connected to the output terminal means of said alternator and secondary winding means, rectifier means having input means connected to the secondary winding means of said transformer means and output means, and coupling means including further rectifier means coupling the output means of said rectifier means to the control electrode means of said thyristor means and switch means interposed between the output means of said rectifier means and said switching means, said secondary winding means of said transformer means producing a voltage for switching said switching means to its current conducting condition when said output voltage of said alternator has a magnitude below that required for self-excitation of said alternator and for energizing the switch means of said coupling means to short-circuit the output voltage at the output means of said rectifier means to switch said switching means to its non-conducting condition when said output voltage has a magnitude equal to and greater than that required for said self-excitation thereby to apply voltage to the excitation winding of said alternator through said voltage regulating means when the output voltage of said alternator has a magnitude which is at least equal to that required for self-excitation of said alternator.

8. A circuit as claimed in claim 7, wherein the switch means of said coupling means includes a Zener diode biased to conduction when the output voltage of said alternator has a magnitude equal to that required for self-excitation of said alternator.

9. A circuit as claimed in claim 7, wherein the switch means of said coupling means includes a thyristor connected to short-circuit the output means of said rectifier means and having a control electrode for determining the conducting condition thereof and a Zener diode connected between the output means of said rectifier means and the control electrode of said thyristor, said Zener diode being biased to conduction to bias said thyristor to its conducting condition when the output voltage of said alternator has a magnitude equal to that required for self-excitation of said alternator.

10. A circuit as claimed in claim 9, wherein the thyristor means of said switching means comprises a first thyristor connected in a first circuit branch between the output terminal means of said alternator and the excitation winding thereof and a second thyristor connected in a second circuit branch between the output terminal means of said alternator and said excitation winding.

11. A circuit as claimed in claim 9, wherein the thyristor means of said switching means comprises a first semiconductor thyristor connected in a first circuit branch between the output terminal means of said alternator and the excitation winding thereof and a second semiconductor thyristor connected in a second circuit branch between the output terminal means of said alternator and said excitation winding.

12. A circuit as claimed in claim 9, wherein the output terminal means of said alternator comprises a plurality of output terminals providing voltages of different phases from each other and wherein the thyristor means of said switching means comprises a first thyristor connected in a first circuit branch between one of the output terminals of said alternator and the excitation winding of said alternator and a second thyristor connected in a second circuit branch between another of the output terminals of said alternator and said excitation winding.

13. A circuit for initiating self-excitation of an alternator having an excitation winding positioned in operative proximity with other components of said alternator and output terminal means for providing the output voltage of said alternator, said circuit comprising voltage regulating means for providing a substantially constant DC voltage connected between the output terminal means of said alternator and the excitation winding thereof;

thyristor means having a current conducting condition and a non-conducting condition connected as a bridge across said voltage regulating means between the output terminal means of said alternator and the excitation winding thereof, said thyristor means having control electrode means for determining the conducting condition thereof; and control means coupled to the output terminal means of said alternator and to said control electrode means of said thyristor means for controlling the conducting condition of said thyristor means to switch said thyristor means to its current conducting condition thereby to short-circuit said voltage regulating means and apply the output voltage of said alternator directly to the excitation winding of said alternator when said output voltage has a magnitude which is below that required for self-excitation of said alternator.

14. A circuit for initiating self-excitation of an alternator having an excitation winding positioned in operative proximity with other components of said alternator and output terminal means for providing the output voltage of said alternator, said circuit comprising voltage regulating means for providing a substantially constant DC voltage connected between the output terminal means of said alternator and the excitation winding thereof;

switching means having a current conducting condition and a non-conducting condition connected as a bridge across said voltage regulating means between the output terminal means of said alternator and the excitation winding thereof, said switching means comprising thyristor means having control electrode means for determining the conducting condition thereof; and control means coupled to the output terminal means of said alternator for controlling the conducting condition of said switching means to switch said thyristor means to its current conducting condition thereby to short-circuit said voltage regulating means and apply the output voltage of said alternator directly to the excitation winding of said alternator when said output voltage has a magnitude which is below that required for self-excitation of said alternator, said control means including transformer means having primary winding means connected to the output terminal means of said alternator and secondary winding means coupled to the control electrode means of said thyristor means and providing continuous control even at output voltages below that required for self-excitation of said alternator.

References Cited

UNITED STATES PATENTS 2,145,424   1/1939   McPowell _____ 322—60 X
3,209,234   9/1965   Bridgeman et al. _____ 322—28

MILTON O. HIRSHFIELD, *Primary Examiner.*

J. D. TRAMMELL, *Assistant Examiner.*